(12) United States Patent
Dorai et al.

(10) Patent No.: US 7,121,469 B2
(45) Date of Patent: Oct. 17, 2006

(54) SYSTEM AND METHOD FOR SELECTIVE PROCESSING OF DIGITAL IMAGES

(75) Inventors: Chitra Dorai, Chappaqua, NY (US); Gaurav Jain, Philadelphia, PA (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/307,099

(22) Filed: Nov. 26, 2002

(65) Prior Publication Data

US 2004/0099741 A1    May 27, 2004

(51) Int. Cl.
*G06K 7/10* (2006.01)
(52) U.S. Cl. ............ 235/470; 235/462.01; 235/462.08
(58) Field of Classification Search ..............................
235/462.01–462.48, 494, 454, 470
See application file for complete search history.

(56) References Cited

U.S. PATENT DOCUMENTS

| | | | | |
|---|---|---|---|---|
| 5,120,940 A | * | 6/1992 | Willsie | ............. 235/462.08 |
| 5,296,690 A | * | 3/1994 | Chandler et al. | ......... 235/462.1 |
| 5,512,739 A | * | 4/1996 | Chandler et al. | ....... 235/462.09 |
| 5,770,841 A | * | 6/1998 | Moed et al. | ................. 235/375 |
| 5,974,202 A | * | 10/1999 | Wang et al. | ................. 382/306 |
| 6,056,195 A | * | 5/2000 | Spain | .......................... 235/432 |
| 6,123,262 A | * | 9/2000 | Shellhammer | .......... 235/462.09 |
| 6,141,441 A | * | 10/2000 | Cass et al. | ................... 382/166 |
| 6,212,504 B1 | * | 4/2001 | Hayosh | ........................ 705/64 |
| 6,236,735 B1 | * | 5/2001 | Bjorner et al. | .............. 382/101 |
| 6,327,395 B1 | * | 12/2001 | Hecht et al. | ................. 382/306 |
| 6,389,182 B1 | * | 5/2002 | Ihara et al. | ................. 382/309 |
| 6,541,428 B1 | * | 4/2003 | Joye | ............................ 508/329 |
| 6,561,427 B1 | * | 5/2003 | Davis et al. | ............ 235/462.07 |
| 6,594,406 B1 | * | 7/2003 | Hecht | .......................... 382/306 |
| 6,732,915 B1 | * | 5/2004 | Nelson et al. | ............... 235/375 |

\* cited by examiner

*Primary Examiner*—Ahshik Kim
(74) *Attorney, Agent, or Firm*—Thu Ann Dang; Anne Vachen Dougherty

(57) ABSTRACT

A system and method for obtaining selected image information from a digital image and providing that selected image information for selective handling. In one aspect, the present invention automatically locates and segments an item identifier from an image caught by a digital camera and provides image information related to the item identifier for processing. Alternatively, a user can designate what areas of an image comprise the item identifier of interest for further viewing or processing.

22 Claims, 8 Drawing Sheets

These tasks can be done at your pace. They are intended to serve as a review of the topics in the previous chapters. Work on your own with minimal instruction. If you need assistance, use the book
710
FIG.7
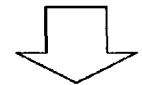
720
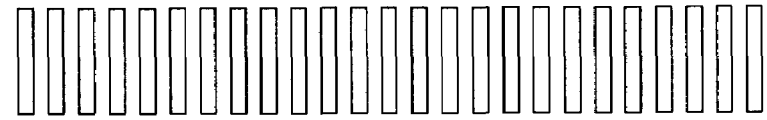

SYSTEM AND METHOD FOR SELECTIVE PROCESSING OF DIGITAL IMAGES

FIELD OF THE INVENTION

The present invention relates to systems and methods for selectively processing less than all of the image information in digital images. More specifically, the present invention provides a system for identifying image information, by user input or by automatically obtaining the locations of image information, such as barcodes in an image independent of their orientation and position, and for selectively handling the identified image information.

BACKGROUND OF THE INVENTION

Item identifiers comprise visibly detectable unique image information, such as bar codes, encoded areas at the periphery of or incorporated into the image itself, and non-encoded yet unique image components which serve to identify or categorize an item or image subject. The information can be extracted automatically, for example by an optical scanner, or can be read or otherwise detected by a user. Independently-created item identifiers are employed by retailers to identify, track, and manage inventory items. If entered into a database, the item identifier can be cross-referenced to other relevant item information such as pricing, inventory, purchase terms, etc.

Barcodes are a ubiquitous form of item identifier. With the adoption of UPC as the standard for retail grocery stores in the late 1970's, barcodes have become a fast, easy, and accurate data entry method. A barcode encodes information related to an item with which the barcode is associated. Typically, a barcode is associated with an item by affixing the coded pattern of the barcode to the item or to the item's packaging. In order to use a barcode associated with an item, a retailer first extracts encoded information from the barcode using a barcode scanner. The extracted information may consist of an identification code such as a Stock Keeping Unit (SKU). Of course, instead of scanning the barcode, the identification code which may be printed beneath the barcode itself may be manually read and entered into a device via a keyboard. In either case, the detected code may then be used to retrieve a retail price of the item from a database, to update a location of the item in a database, to obtain warranty or other information regarding the item from a database, etc.

In view of the prevalence and usefulness of barcodes, many devices for extracting information from them have been developed for use by retailers and consumers. These devices include grocery checkout scanners, handheld scanners, and scanning pens. Peripheral modules capable of decoding barcodes are also being developed for devices such as Personal Digital Assistants (PDAs) and mobile telephones. Some of these devices are capable of extracting information from barcodes of several different formats. One system, the Cue Cat™ system by Digital:Convergence, operates by scanning a pen across a barcode from a product or advertisement to extract the code and then causing a World Wide Web ("Web") browser to access a Web page related to the product or advertisement. In view of the number and diversity of available barcode-decoding devices, the development and purchase of these devices represents a substantial capital investment by manufacturers and consumers alike.

Most of the conventional devices make use of laser based technology for reading the barcodes. A basic barcode reader consists of a laser scanner and a decoder, with a cable to interface the decoder to the computer or terminal. In operation, the scanner scans a barcode pattern and produces an electrical output that corresponds to the bars and spaces in the scanned pattern. A decoder then takes the digitized bar space patterns, decodes them to the correct data, and transmits the data to the computer over a wired or wireless connection, immediately or on a batch basis. Most laser based barcode readers have high power consumption due to the power requirements of the laser system in the scanner. Such power consumption requirements are an impediment to using laser-based barcode readers in small, low-powered devices, such as personal data assistants (PDAS) or cellular phones. Moreover, the use of the scanning devices has been, to date, limited to reading barcodes only and not to making use of the read/extracted information.

Existing technology for the use of extracted item identifiers and the associated item information has been detailed in U.S. patent application Ser. No. 09/847,779, filed on May 2, 2001 and entitled "SYSTEM TO INTERPRET ITEM IDENTIFIERS" (YOR92001-0118). Therein a digital camera is used to capture an image of an item identifier and to transmit the image to a central server. In response to the transmission, item information is received from a central server. For transmission of image information, which are traditionally large files, image compression mechanisms have been developed, such as JPEG, TIFF, and GIF. The following reference describes examples of the state of the prior art: Encyclopedia of Graphics File Formats, Second Edition, J. D. Murray and W. VanRypers, O'Reilly & Associates, Inc., California, 1996.

The output of a digital camera is typically a JPEG-compressed color image. JPEG, one of the leading industrial image compression mechanisms, was designed for compressing either full-color or gray-scale images of natural, real-world scenes. JPEG is specially adapted for photographs, naturalistic artwork, and similar material, but does not give best results for lettering, simple cartoons, or line drawings. The JPEG compression process is "lossy," meaning that the decompressed image isn't quite the same as the original image. (There are lossless image compression algorithms, but JPEG achieves much greater compression than is possible with lossless compression methods.) JPEG is designed to exploit known limitations of the human eye, notably the fact that small color changes are perceived less accurately than are small changes in brightness. Thus, for compressing images that will be looked at by humans, such as the ones captured by a digital camera, JPEG is one of the most used standards for compressing the digital images.

One useful property of JPEG is the ability to vary the degree of lossiness by adjusting the compression parameters. Accordingly, an image creator can balance file size against output image quality, for example generating very small files when low image quality is acceptable as it is when indexing image archives. Conversely, if a better output quality is desired, the compression can be tailored to increase the output image quality to a satisfactory level.

Yet another aspect of image extraction, whether of an independently-created item identifier which is added to the image or of an item identifier comprising image content information, is the preference to allow a user to identify which image information is of interest as the item identifier for further treatment, whether it be further viewing, image transmission, or image processing. For mobile commerce, images have become an integral part of the communications; however, not all of the information contained in every image is of interest for the execution of mobile applications and/or for the sharing of information among users (i.e., shared image presentation in, for example, video-conferencing applications). Since most image compression techniques are not tailored to application-specific requirements, those techniques are often not useful for mobile commerce applications. What is needed is a way for users of mobile devices to indicate which portions of an image are item identifiers which are of interest to the application, thereby allowing selective processing (e.g., compression) and, a way to prioritize scarce bandwidth resources to support the transmission of necessary image data.

Another problem with mobile imaging devices is that the existing bandwidth is rarely sufficient to transmit the full quality images captured by standard digital cameras. Such images, uncompressed, can reach 2 MBs in size and can still be 200 KB when compressed. Even with a commonly available cellular communications connection of 9600 bits/second performing a successful, error free transmission, would still require ~176 seconds to transmit a 200 KB photo image. Prior art methods for selective reduction of video data include U.S. Pat. No. 6,356,664 entitled "SELECTIVE REDUCTION OF VIDEO DATA USING VARIABLE SAMPLING RATES BASED ON IMPORTANCE WITHIN THE IMAGE," wherein regions are selectively reduced using variable rate sampling. However, the prior method is not user interactive and does not remove or segment image data.

It is desirable, therefore, and an object of the present invention, to provide a system and method for extracting selected image information as item identifiers for selective image handling.

It is another object of the invention to provide automatic item identifier extraction whereby embedded image information can be extracted by low cost, low power consumption means prior to JPEG compression and transmission.

Yet another object of the invention is to provide a system and method whereby a user can designate an image area of interest within an image as an item identifier for further treatment.

SUMMARY OF THE INVENTION

The foregoing and other objects are realized in the present invention which provides a system and method for obtaining selected image information from a digital image and providing that selected image information for selective handling.

In one aspect, the present invention automatically locates and segments an item identifier from an image captured by a digital camera. The located and segmented item identifier can be preprocessed prior to transmission. Determining the location of the item identifier in the image reduces the size of the actual image required to be transmitted across the network. As a result, the time required to transfer the extracted image information, or a compressed version of the extracted image information, along a network is also minimized. According to one embodiment, the extracted item identifier image is a compressed image; and, after segmenting the identifier, the smaller identifier image is again JPEG-compressed before transmitting it along a network (e.g., to a server).

In another embodiment, the present invention provides a system to automatically extract the meaningful information from the image captured using the digital camera. The extracted image information can be processed locally (i.e., at the digital camera) or can be transmitted for interpretation and/or processing. Accordingly, generic digital devices can then be used to interpret the item identifiers, such as barcodes, rather than using expensive, customized, laser-based readers. The system has the advantage that it can also extract locations of multiple barcodes if several are present in the image. The barcodes can be present in any orientation in the image and the system will detect the orientation of the barcodes.

Yet another embodiment allows user-directed identifying of item identifiers in images for extraction of the image information to facilitate for more detailed viewing, processing, analysis, transmission, etc. As a barcode or other item identifier can be segmented from the image for transmission, so, too, identified image area identification information is segmented, or added as metadata, for selective compression and/or selective transmission.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

The invention will now be described in detail with specific reference to the appended drawings wherein:

FIG. 7 is a representative view of the edge extraction process as used in an embodiment of the present invention;

DETAILED DESCRIPTION OF THE INVENTION

Figure 1:
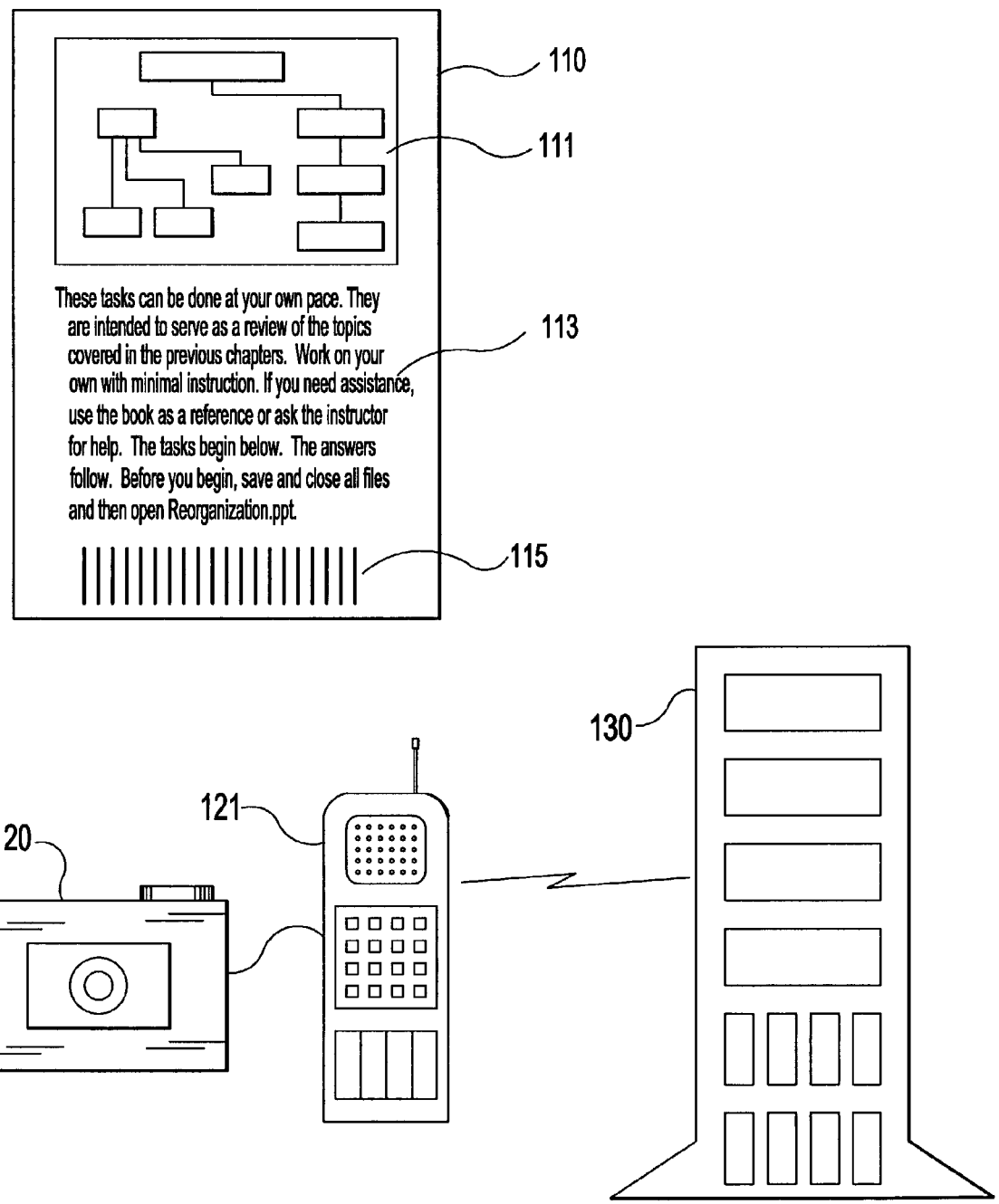
FIG. 1 is a representative view of the environment according to the embodiment of the present invention.

FIG. 1 is a topological view of the processing environment for the present invention. An image 110, is available for capture through a digital camera 120 attached to, or incorporated into (not shown), a cellular phone 121 or other digital communication device (e.g., a PDA). Image information extracted from image 110 is communicated to server 130 from cellular phone 121 or other digital communication device. While the connection is shown in the figure as a direct connection, it may also be established through a network, through the Internet, through an ISP, etc. The digital camera can additionally be disposed in a cellular telephone or other digital communication device. For the illustrated example, the image 110 comprises a document having three kinds of image information including a graphical image component 111, a text image component 113, and a barcode image component, 115. Digital camera 120 can capture all or a selected part of the image information from the image 110. Under one embodiment of the invention, the "selected" image information which is an independently-created and added item identifier, such as the barcode 115, will be automatically located and extracted from the image; and, under an alternative embodiment, a user will identify an image area (e.g., part of the graphical image component 111) as the selected item identifier image information for further processing. Processing of the selected item identifier image information may be done at the camera/communication device, at a server 130 after communication of the selected image information to a server from the communication device, at the server after communication of coordinates or other information for identifying the location of the selected image information, or a combination of the foregoing. Processing may include decoding of encoded information, coordinate processing, image processing such as compression for transmission, recognition of objects, application dependent processing (e.g., database lookups and responses) etc. The different treatments of image components of image components will now be detailed with reference to FIGS. 2–11.

Figure 2:
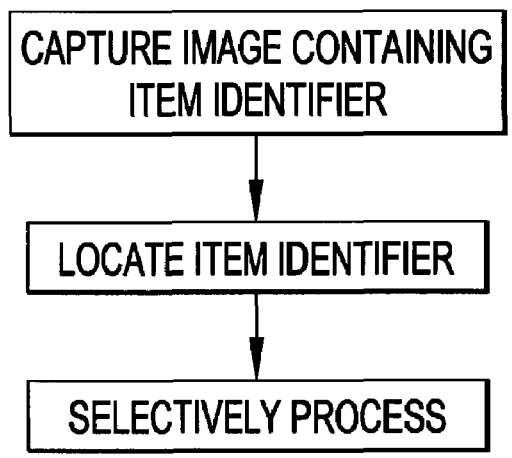
FIG. 2 is a flow diagram of process steps to handle an item identifier in an image according to the present invention.

FIG. 2 is a flow diagram of process steps to handle an item identifier image component, which is incorporated into, otherwise accompanies, or is part of an image and which can be captured by a digital camera. Initially, an image of an item identifier is captured at step 221. The item identifier may be captured using a-digital camera integrated with the wireless device, or by any currently or hereafter known device for capturing digital images in any format (e.g., JPEG, color based formats such as R,G,B (red, green, blue), and intensity based formats). An item identifier may comprise a barcode, as described above, an image, or any other detectable, non-text image information usable to identify an item or image subject, including but not limited to a portion of the image, a portion of the item, a face, a pattern, a color, or a texture. The item identifier may be located on the item, on or in the item's packaging, in a promotional offer for the item, on circulated printed materials, on a product display, or on any other media from which an image of an identifier may be captured. In this regard, an item according to the present invention may include a product, a service, an event, an image, a website, a location, a being (e.g., an animal or person) or any other entity for which information may be obtained.

The item identifier is located in step 222 either automatically or by user designation as detailed below. After locating the item identifier, the item identifier is selectively processed at step 223. Selective processing may include extraction, whereby the minimal image which contains the whole identifier is extracted from the image. Representative extraction techniques are detailed below with reference to FIGS. 3–6. Image information may be processed by being transmitted in step 223 to a server. For example, a digital camera used in step 221 may transmit the extracted image to a remote device, server 130, for processing of the image. Such processing may also include decoding of item identifiers to determine item information associated with the product identifier, or accessing a remote web site from the server 130 to obtain additional information about the item. Additional processing could include discarding non-relevant (or non-user-designated) image information, aligning image information, sharpening relevant image information, and black and white transformation. Further, the processing can include associating metadata, such as coordinates, annotations (e.g., circling of the item identifier), dominant orientation information, etc., with the item identifier image portions. Metadata can be incorporated into or superimposed on the item identifier image portion, added as a watermark, appended to the image file, or otherwise associated with the item identifier.

Depending upon the processing capability available at the digital communication device which is associated with the digital camera, some processing of the extracted image may be undertaken prior to transmission. For example, JPEG compression, or another compression technique, can be applied to reduce the bandwidth necessary for transmitting the extracted image to the server. Local decoding, complete or partial, of the item identifier may also be done by the camera or digital communication device if such a capability is available. If the digital communication device is able to decode the extracted item identifier to obtain contact information, the digital communication device may be able to directly communicate with the contact address to obtain additional information about the item.

Figure 3:
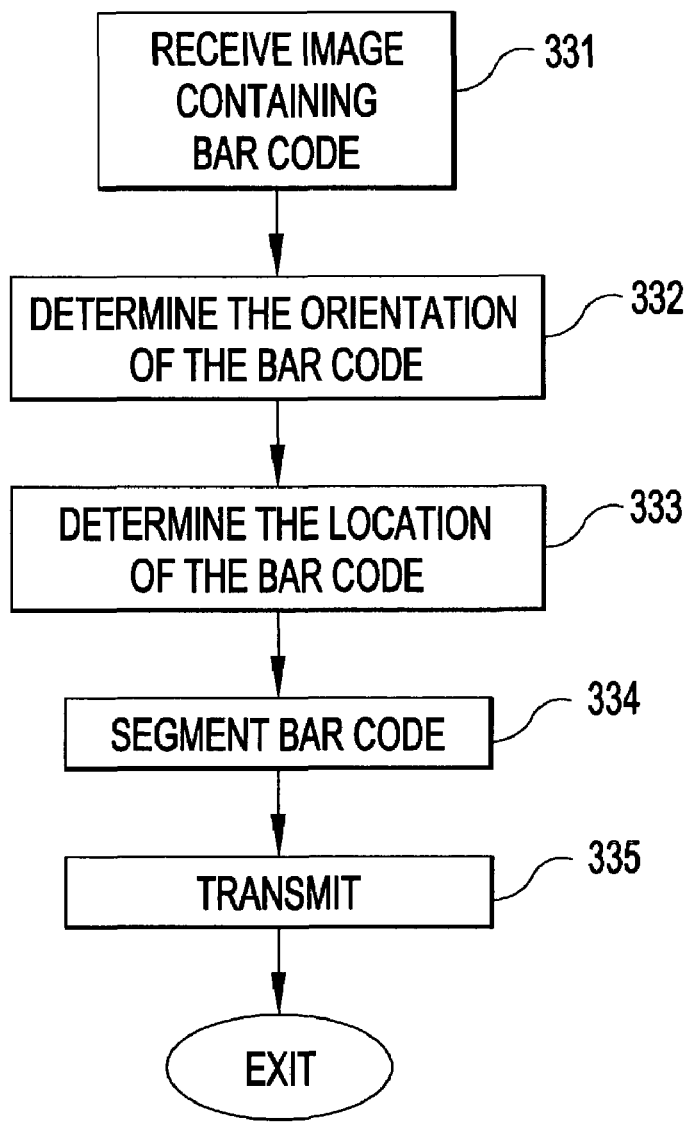
FIG. 3 is a flow diagram of process steps to segment the barcode identifier present in the image.

FIG. 3 is a flow diagram of process steps for one method of performing the locating and extracting of step 222 for a commonly known type of item identifier from the image, namely barcodes. Of course, similar processes could be used for any other class of automatically detectable identifier. The image of the barcode is received by the barcode identifier component/software at step 331. The barcode identifier component may be incorporated into the capture device (e.g., the camera); may be incorporated into the digital communication device (e.g., the phone or PDA); or, may be located in an additional peripheral device (not shown). The image is received from the device, such as a digital camera, which captures the image according to step 221 in FIG. 2, and then provides the captured image for processing by the barcode identifier system/software. This image may contain the barcode oriented in any direction and at any zoom factor. In some embodiments, as further discussed below with reference to FIG. 4, there will be multiple barcodes present in a single image. Yet another possibility is that partial barcodes may be provided at one or more locations in or on the image.

At step 332, the orientation of the barcode is determined relative to a predetermined fixed angle. In some embodiments, the fixed orientation is kept as the vertical so that, after orienting, the bars of the barcode are in a vertical position. Of course, the barcodes could be oriented in any other fixed orientation. Depending on the capability of the item recognizor or decoder to decode the item identifier at different orientations, the barcodes can be oriented at needed orientation. A commonly known embodiment of the item decoder recognizes the item identifier from a vertical orientation. When multiple barcodes are present and are oriented at different angles, the image can be divided into small portions with each treated separately. Alternatively, the location of each barcode can be identified and used to divide the image into smaller portions. Parallel processing can be employed with a dedicated process for each orientation angle, such that each process will look for barcodes at a specific angle. A representative process flow for determining the orientation is detailed below with reference to FIG. 5.

Once the orientation has been determined, the barcode is located at step 333. The barcode can be present anywhere in the captured image. As noted above, in some embodiments there may be multiple barcodes present in a single image.

Figure 6:
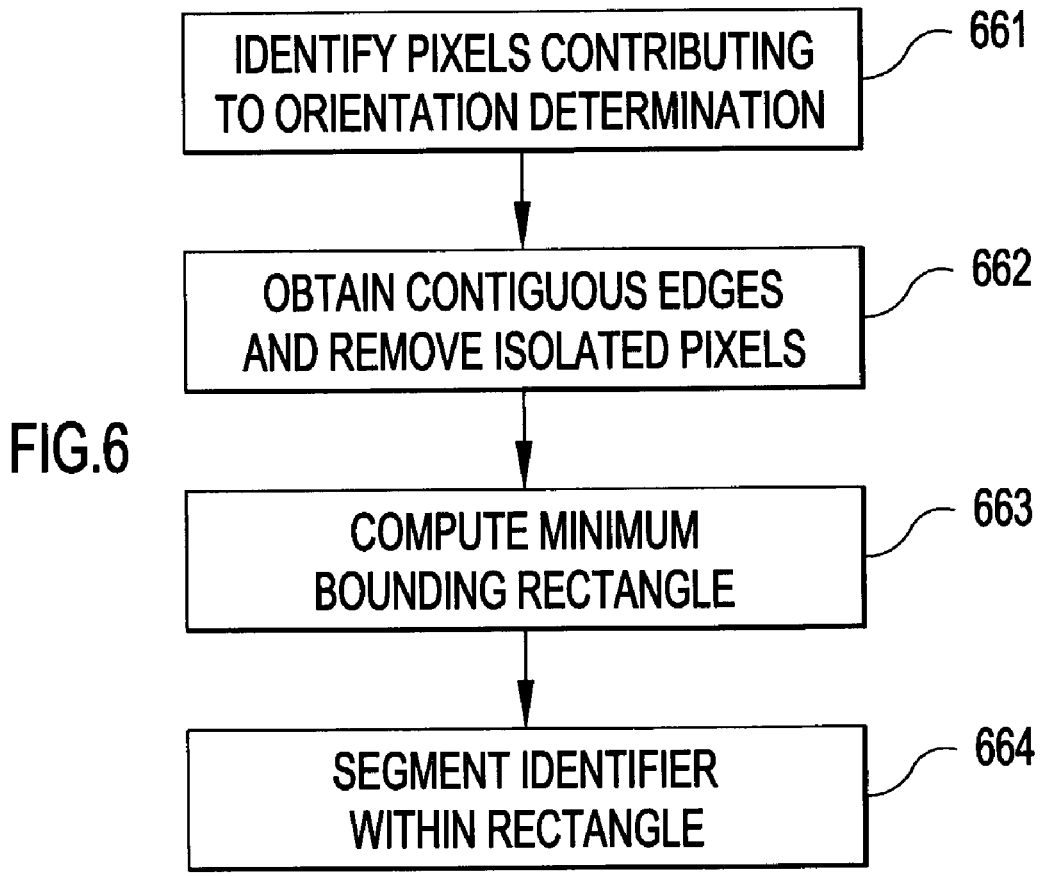
FIG. 6 is a flow diagram of process steps for determining the location of the identifier according to embodiments to the present invention.

FIG. 6 provides a representative process flow for determining the location of the identifier/barcode. One approach is to use the orientation of the bars and the minimum bounding rectangle which can fit in the whole barcode to determine the position of the barcode. In another approach, the barcode image can be captured along a particular alignment, with the top left edge of the barcode being aligned with a guide mark in the viewfinder, which determines the position of the barcode. In yet another embodiment, the center of the barcode is aligned with the center of the viewfinder (e.g., only barcodes in the center are identified) for determining the position of the barcode. Still another embodiment will use edge detection on the captured image, whereby the first long vertical edge detected is used as a position marker for the barcode.

In step 334, the barcode is segmented from the captured image. Segmenting can be done by making use of the location information and the minimum bounding rectangle (MBR) to copy the portion contained within the MBR in the original image, to create a new image. As a result of segmentation, the new image contains just the necessary barcode removed from the background. This minimizes the size of the image that is required to be transferred to the network end. After segmentation, the new image comprising the segmented barcode can be transmitted to server 130 at step 335. As noted above, the digital communication device may pre-process the segmented image, such as by compressing or otherwise encoding the image information, prior to transmission. Additionally discussed above is the option of providing complete or partial local decoding of any encoded information prior to communicating with an outside entity. Clearly such is possible, but unlikely given the limited processing capabilities in present day portable digital communications devices.

Figure 4:
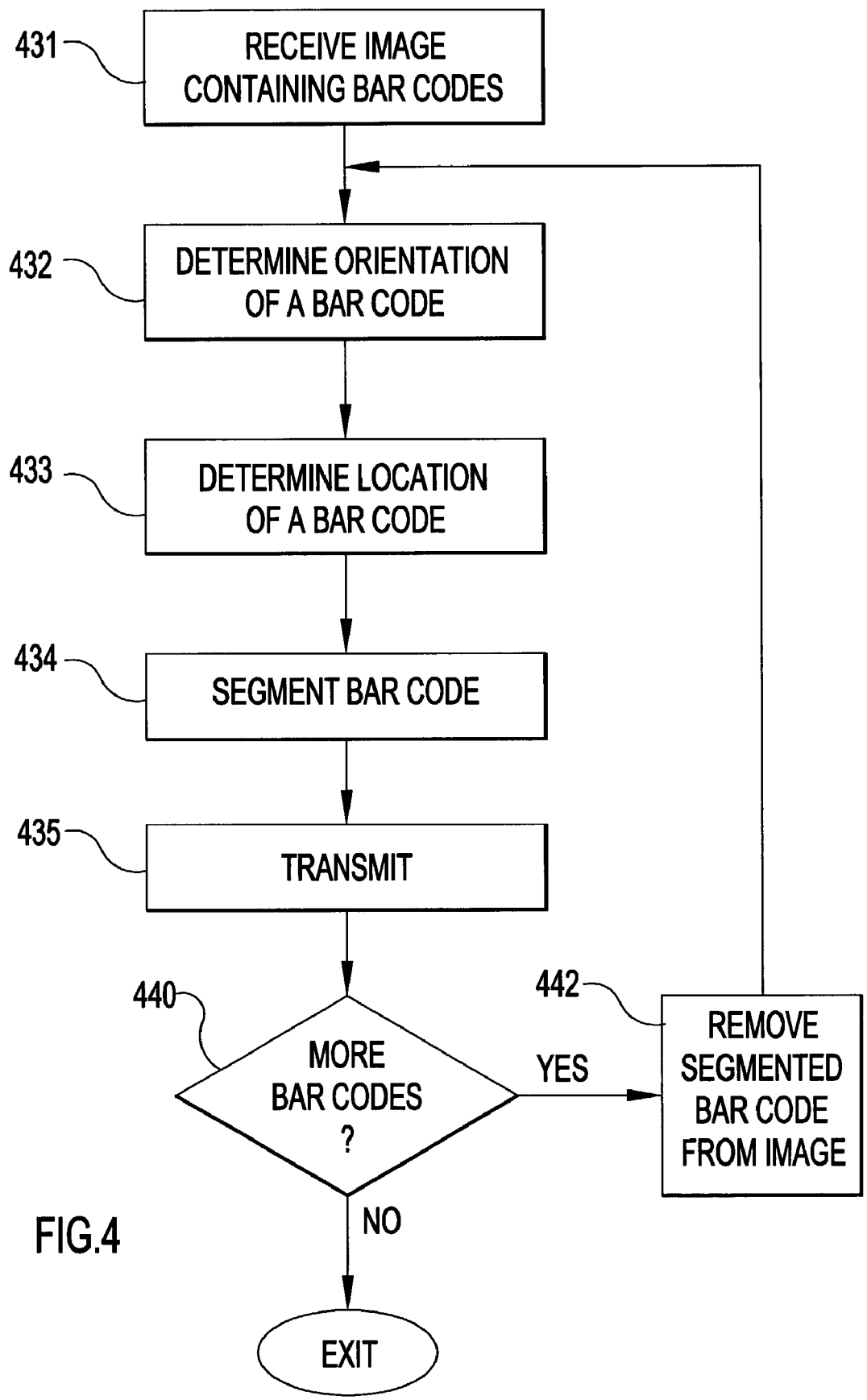
FIG. 4 is a flow diagram of process steps for segmenting multiple barcode identifiers in an image.

FIG. 4 shows a representative process flow for identifying and segmenting multiple barcode identifiers in an image. At step 431, the image containing the barcodes is received from the digital image capturing device. As in the FIG. 3 processing, the orientation of a barcode in the image is determined at step 432, the location of the barcode is determined at step 433, the barcode is segmented at step 434, and information is transmitted at step 435. The barcode identifier component does not cease processing the image, however, at this point. At step 440, it is determined whether there are any more barcodes to be processed. The system can determine whether there are more barcodes by analyzing the edge information computed during step 432. If no more barcodes are present, the system exits. However, if more barcodes have been detected, the barcode identifier component first removes the previously-segmented barcode from the original image to yield a successive image and then processes the successive image by repeating steps 432–435. Depending upon the storage and transmission capabilities of the local components, the process flow of FIG. 4 may be altered to save segmented barcodes until all of the barcodes have been processed, and to then transmit all of the barcodes upon a determination at step 440 that no further non-segmented barcode remain in the image.

Figure 5:
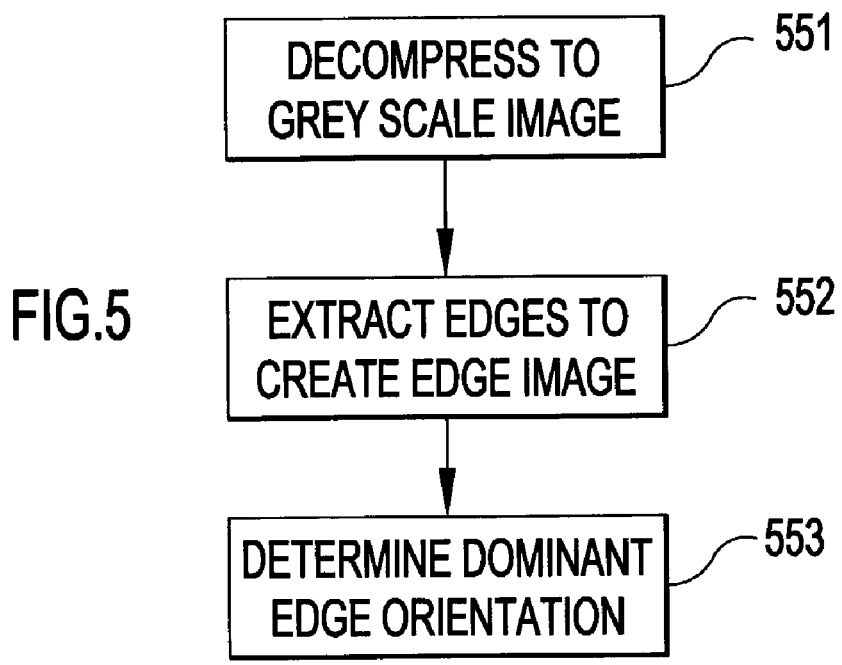
FIG. 5 is a flow diagram of process steps for determining the orientation of the identifier according to embodiments to the present invention.

FIG. 5 depicts a particular embodiment of the orientation determining step 332. The image received from the camera may be compressed using the digital camera default compression option, for example, into JPEG format. This could either be a JPEG, TIFF, GIF or any other standard or proprietary compression technique.

If the image has been received in a compressed mode then, in a preferred embodiment, decompression must be accomplished before processing can take place. The algorithm to accomplish this decompression can be part of the library on the mobile device, can be loaded into the mobile device at configuration time, or can be loaded at the time required. Accessing the algorithm can be accomplished over a network (e.g., wireless LAN, or WAN) or, through a removable media (e.g., a memory stick, flash card). In another preferred embodiment, the image is simply analyzed in compressed form.

In step 551, the received image is uncompressed and converted to a gray scale raster image containing only shades of gray. One representation of a gray scale image containing the barcode is shown in FIG. 7 as image 710. Once the gray scale image is available, the edges are extracted from the given image at step 552. The edges are stored in another image, referred to as an edge image and represented by item 720 of FIG. 7, which is used for further processing. An example of an edge extraction process includes applying an edge extraction filter like the Canny filter to extract the edges from the image. Of course, any other image processing algorithm can be used to extract the edges at step 552. At step 553, the dominant orientation of these edges is calculated. Calculating the dominant orientation can be done by projecting the edge image into the frequency domain, by creating a Hough space from the edge image, or by other known image processing techniques.

Representative steps for dominant orientation extraction using the Hough transform are described here. The regularity and consistent orientation of the bars in a barcode, comprising straight lines of equal length, are used to find the dominant orientation of the identifier image component. The edges are projected in an r-theta Hough space and a novel approach is used which is highly tuned to the barcode pattern. Each point in the edge extracted image gives rise to a curve in the Hough space using a straight line transformation. For all of the co-linear points in the bars of the edge extracted image, such as the ones forming the edge of a single bar of the barcode, these curves intersect at a particular point in the Hough space. This point of intersection of all of the curves corresponds to the common slope-intercept form of the straight line on which the co-linear points in the edge image lie. As a result, each straight line or an edge in the image maps to a point in the Hough space and the intensity of that point is a measure of the number of points which lie on that straight line. The Hough space is sampled using a quantization of a unit pixel intercept and a unit degree on the r axis and the theta axis respectively. A count of points in each sampled cell in this Hough space is maintained. A Gaussian blurring function is applied to the Hough transform across the slope (i.e., the theta) axis to smooth out the noise due to the discrete nature of the image. Thus, an edge point which gives rise to a straight line with a slope theta also adds to the count of the number of straight lines with slope theta plus minus delta. The peaks in the Hough transform cell counts correspond to dominant straight lines in the edge extracted image. Only the top 80% of the peaks are retained to determine the dominant orientation. A simple approach for finding the orientation would be to find the maximum of the sum of peaks for different angles. The angle corresponding to the maximum sum is expected to be the dominant orientation. While the foregoing approach is generally accurate, if the image has a cluttered background containing other straight lines, it is possible that the algorithm will calculate the orientation pertaining to the more predominant background instead of the dominant orientation of the barcode. The regularity pattern of the barcode is used to alleviate this problem.

A series of decision steps can be used to estimate the correct orientation of the barcode. Besides finding the maxima of the sum of the peaks, a measure of goodness of regularity in the angle peaks is also calculated for the particular angle. The separation between neighboring peaks for a given orientation is calculated and the occurrence of the most frequent distance of separation is taken as a goodness measure for that particular orientation. This is done keeping in mind the barcode design. Adjacent solid bars in a barcode are separated by a multiple of some least common distance between them, so it is expected that this distance will show up as spacing between the angle peaks. The sum of the peaks as well as this goodness measure are used to find the predominant orientation of image elements which correspond to a regular structure in the original image.

In FIG. 6, the step 333 of FIG. 3 is elaborated for determining the exact position of the barcode in the image. Some embodiments make use of the dominant orientation information calculated in step 553 to determine which pixels contributed in determining that orientation, as represented by step 661. These are the pixels that need to be considered in the following steps to determine the location of the barcode as shown as item 810 of FIG. 8. In some embodiments of the system, contiguous pixels are chosen from the pixels identified in step 661 using a chaining process. The chaining process allows the determination of adjacent edge pixels to the pixels identified in step 661 that all lie along the same straight line. In some embodiments, an edge tracking process can be used to determine the contiguous pixels lying along the same edge. Step 662 selects straight edges from the remaining pixels and eliminates isolated pixels from edges other than the edges of the barcode which do not form a regular pattern. All single dimension barcodes containing straight bars are sieved out in this step to produce image 810.

With reference to the detailed steps for determining the orientation of the barcode in the image using the Hough transform, in order to locate the barcode the vertical redundancy (repetition) of the bars along with their neighborhood information (spacing between bars) is used. Using the edge-extracted image, a mask is generated depending on whether or not that point contributed to a peak in the correct orientation in the Hough space. Thus all of the points that constituted the edges of the barcode are also included in the mask. The aim is to remove points from the mask with successive steps so that, in the end, there remains only the barcode which could easily be segmented out by creating a bounding box over the remaining points.

Many of the barcodes are printed with text around them which gives rise to false detection of edges of the text characters. The most probable examples of inclusion of text along with barcodes is from the product labels in the case of UPC codes and the textual description on back covers of books where ISBN codes are coded using EAN13. The length of the barcode is exploited to differentiate the edges of the barcodes from those of the text in the background. The barcode pattern consists of vertical lines oriented in a particular direction. After determining the orientation of the image, the occurrence of straight lines of length above a threshold is found using a chaining algorithm. Given any point in the mask, there should be some minimum number of points which are co-linear with its neighbor in the same direction of the estimated orientation. Points which do not satisfy these minimum co-linear neighborhood criteria are removed from the mask. In general, the barcodes are present near the surface boundaries of the object and, as the length of the edges is more than the length of the barcode, they are often sieved out along with the barcode in the chaining step.

But these edges often stand alone and, unlike the barcode, they do not have another similar edge in the neighborhood. All edges which are not in the same orientation with that of the barcode are already removed; but there still remain some long edges parallel to the barcode which need to be removed. To alleviate this problem, singular (isolated) edges can be removed using a neighborhood criterion. The point from the mask is removed if it does not have sufficient numbers of neighbors in the direction orthogonal to the orientation of the barcode.

Figure 9:
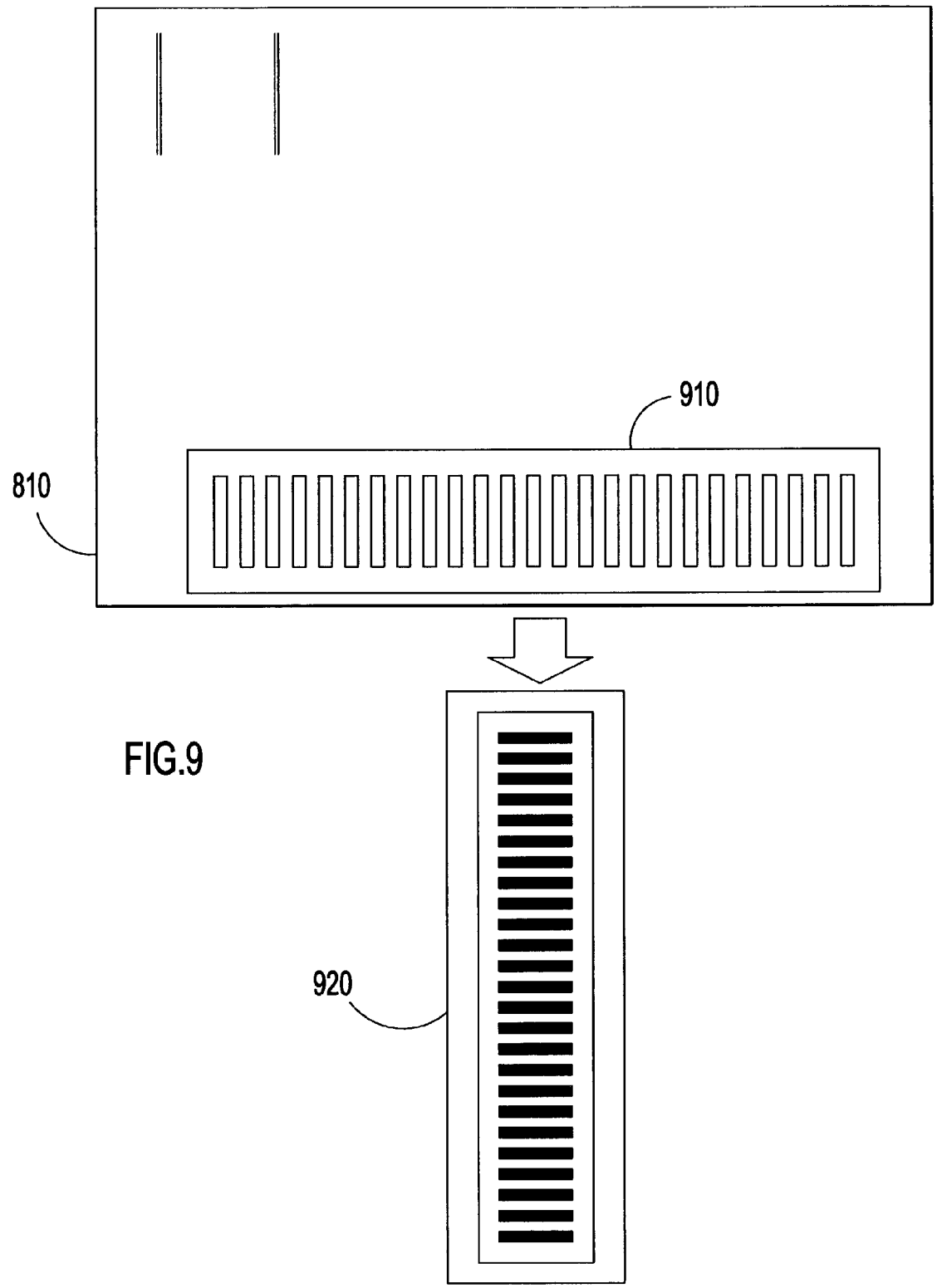
FIG. 9 is a representative view for the minimum bounding rectangle (MBR) for the barcode and the barcode segmentation process.

At step 663 the smallest rectangle which can contain the whole barcode is computed as shown as item 910 of FIG. 9. This is also the smallest size of the segmented image in which the barcode could be contained. One way of implementing this is to use the dominant orientation information calculated in step 332 and the contiguous pixel location to find the minimum bounding rectangle. It is to be noted that one of the edges of the minimum bounding rectangle can be in the same direction as that of the dominant orientation as calculated in step 332. The minimum bounding rectangle thus obtained in step 663 can be used to create a smaller image which contains the whole barcode. The size of the edge extracted image corresponds exactly to the originally captured image. The position of the minimum bounding rectangle is also the position of the actual barcode in the original image. Interpolation can be used to segment the barcode from the original image to a smaller image as shown by item 920 of FIG. 9. In step 664, the barcode is segmented from the original image and made available for further processing. In some embodiments, the left-most bar and the right-most bar of the barcode can be identified, their x and y coordinates determined to compute the minimal region occupied by the barcode, and the region information used to segment the barcode. Once the orientation and the location of the barcode are determined, the maximum and minimum bounds on the remaining points in the mask are calculated and the center of the barcode is calculated. An affine transformation can be carried out using the angle of orientation and the dimensions of the bounding box in the horizontal direction to determine the exact bounding box oriented in the same direction as that of the barcode. This is the minimum bounding rectangle for the barcode. Bilinear interpolation is used on the original image to segment out the barcode using the minimum bounding rectangle which has been computed. The cropped barcode is JPEG compressed to minimize the file size, and can then be transmitted over the network, if necessary for barcode symbol identification using a barcode recognition engine.

Figure 8:
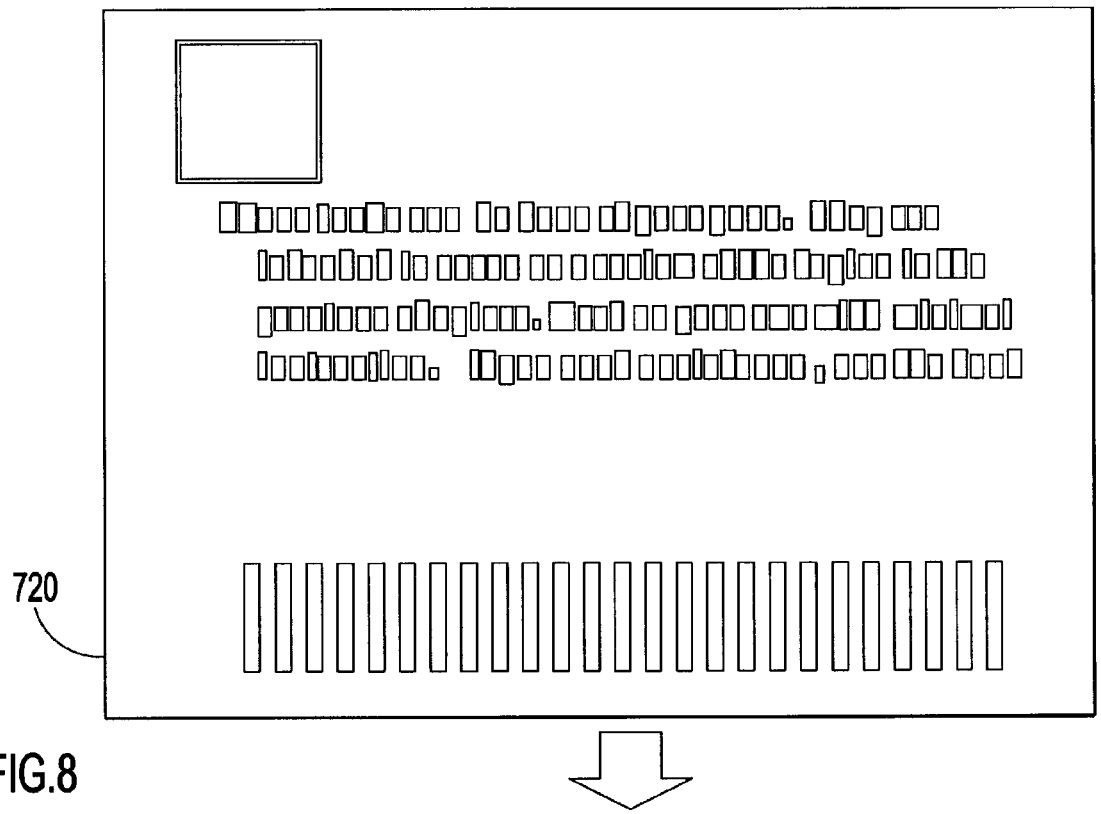
FIG. 8 is a representative view for the dominant orientation determining process as used in an embodiment of the present invention.
Figure 8:
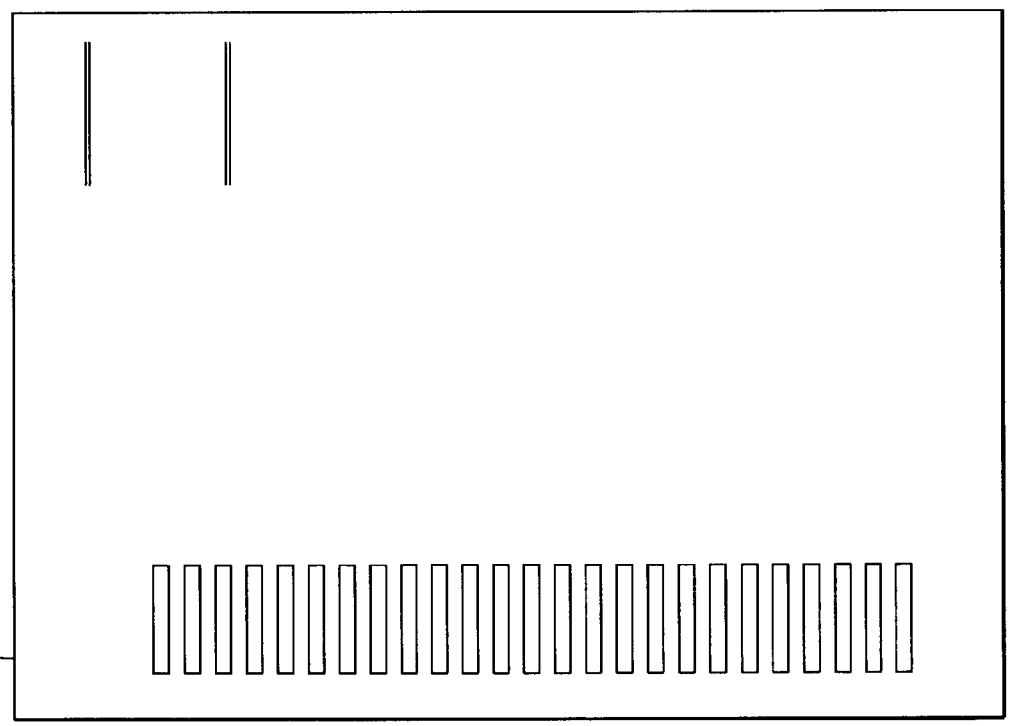

FIG. 7 is a representative view of the edge extraction process as used in an embodiment of the present invention and described above with reference to FIG. 5. The initial gray scale image is represented at 710 prior to edge extraction. After being passed through the Canny filter or other edge extraction technique, the resulting image, shown at 720, is analyzed to determine the dominant orientation and then the location of the barcode or other identifier image component. FIG. 8 is a representative view for the dominant orientation determining process as used in an embodiment of the present invention detailed above with reference to FIG. 5. After the edge extraction step outputs image 720, that resulting image is analyzed to determine the dominant orientation of the edges. In the illustrated example of a barcode, the regularity and compactness of the edges makes it easier to determine the dominant orientation and to pare the gray scale image down to the image shown at 810 wherein only the contiguous edge pixels which are oriented along the dominant orientation are depicted. Clearly there are many edge components in the text portion of the edge extracted gray scale image 720 which also lie along the dominant orientation. Those so-called isolated edges are not considered informational for purposes of locating the item identifier. If an item identifier is not a barcode, but a face, a commonly known face extraction algorithms are used to locate, determine the MBR of the face and segment the face in the image to result in a smaller image containing only the face. Finally, the minimum bounding rectangle is determined for the located barcode as shown in image 910 of FIG. 9 as a representative view for the minimum bounding rectangle (MBR) for the barcode. Upon determining the MBR, the barcode segmentation process can be undertaken to extract or segment the barcode from the rest of the image.

As mentioned above, one a barcode or other item identifier has been extracted from the original image, that segmented information can be transmitted to a server for processing, such as for decoding the barcode to determine item information such as source, cost, contact information, etc. The server may decode the item information and then communicate that information for display to a user of the digital communication device. If the decoded item identifier additionally includes contact information, such as a web address, the server can contact the web address for the user or can simply return that contact information to the user, after which the user will utilize that contact information to directly obtain additional item information. Should the digital camera or digital communication device have enhanced processing capabilities, the item identifier may be decoded for the user locally. Assuming that the digital camera has some image compression capabilities, such as JPEG, the segmented item identifier can be compressed for transmission depending upon the available bandwidth. Alternatively, or in addition, the digital communication device may have compression software for pre-processing the image information prior to transmission and for decoding information received from the server.

In some instances, the available image may not include a barcode or other detectable, structured item identifier. In those cases, it may not be possible for the digital camera to discern which image information will be of interest to, or of further use to, a user or group of users. In such a case, the present invention additionally provides the capability for a user to interact with the image and to designate what image information is of interest as the item identifier for further display and/or processing. A simple example would be the instance where multiple items are displayed with multiple barcodes. Rather then recursively processing the image, as detailed above with reference to FIG. 4, it may be computationally more efficient to allow the user to designate which image component (e.g., which office product on a catalog page of products) is of interest. Another example is a conference during which a plurality of users are collectively viewing an image from remote locations and are collaboratively making changes to the "whiteboard". When one of the users wishes to isolate particular image information for further viewing, alteration, compression, transmission, decoding, etc. (all of which will be hereinafter collectively referred to as "processing"), the user can indicate the image areas of interest for further processing. Knowing that the image files are generally quite large for transmission over connections having finite bandwidth, selective compression of only user-designated item identifiers will enhance the quality and speed of transmission of relevant image information.

Figure 10:
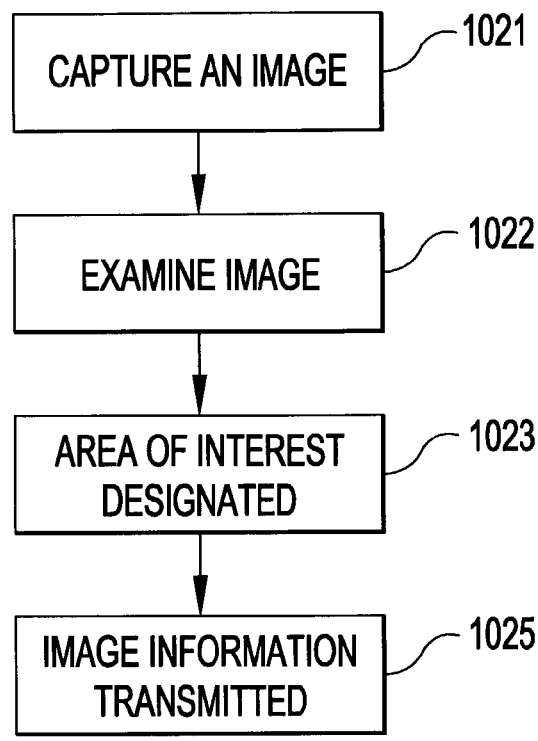
FIG. 10 is a flow diagram of process steps for the user-directed identification of a selected image area as an item identifier for selective image handling.

FIG. 10 is a flow diagram of process steps for the user-directed identification of a selected image area as the item identifier for selective image handling. On the sending end, at which the digital camera and digital communication device are found, the image is first captured, automatically or at user direction, at step 1021. Next, at step 1022, the image is examined, again by a user or by perhaps by a scanning/extraction device as detailed above. At step 1023 areas of interest within the image are designated. In the case of automatic extraction, this step may include the processing presented above when a detectable image component or item identifier is located in the image. When no such detectable image component exists, a user may indicate the area of interest. The user input may be provided in a variety of ways such as with a wand attachment, a touch screen, a trackpoint, a mouse, a trackball, a keyboard or touchpad for receiving coordinate information, a voice recognition system, an image recognition system, and so on. The selection area can be incorporated into the image (e.g., a line could be drawn, highlighting could be added, etc.) or could be created as a separate metadata file (for example, including image coordinates) associated with the image file. Once the area of interest has been designated, if coordinates have not been provided by the user, the coordinates can be determined for the designated item identifier area. Therefore, an optional processing step or series of steps (not shown) can be implemented at the digital camera, the display component, or the digital communication device, to determine coordinates, create metadata, segment the designated image information, discard the non-designated information, compress the image, etc. Finally, at step 1025, the item identifier image information is transmitted. The item identifier image information which is transmitted may be the uncompressed designated area of interest from the original image, a compressed version of the designated area of interest of the image, coordinate information about the area of the image which has been designated, metadata about the designated area, or a combination of the foregoing.

If a compression process is required, the selected and non-selected portions of the original image can be handled in different ways. Assuming that the user only wants the selected area of interest and will have no further need of the non-selected image information, the non-selected portions can be discarded and the selected portions compressed for transmission. Alternatively, the selected portions can be given priority for use of the resources, according to some proportion which is either predetermined or user specified at the time of selection. For example, 80% of the resource of the bandwidth can be allocated to transmission of the selected item identifier image portion with the remaining image portions being communicated on a lower priority basis. Also, different compression levels or techniques can be applied to the selected and non-selected image portions. As an example, for a mobile application which is performing barcode recognition, a compression which preserves black and white may be used despite the fact that a color camera captured the image, so that the salient information from the image is retained for recognition.

Figure 11:
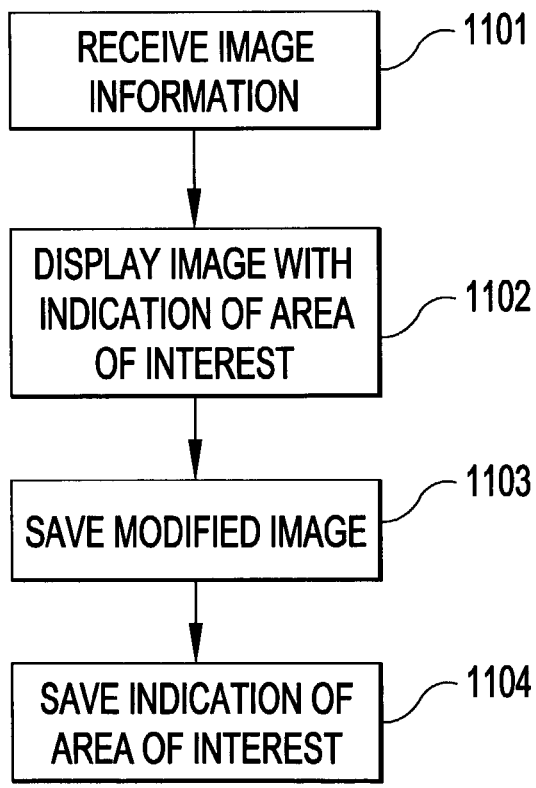
FIG. 11 is a flow diagram of process steps for selective image handling for mobile commerce applications.

FIG. 11 is a flow diagram of process steps for selective image handling for mobile commerce applications (e.g., video conferencing) at the receiving end of a system (i.e., server 130). At step 1101, the server receives item identifier image information from the digital communication device and, at step 1102, displays the image with the area of interest indicated. This step may be followed by a confirmation step (not shown) wherein the user views the displayed image and verifies that the indicated area of interest is the area of interest which the user intended to designate. Thereafter, at 1103, the server saves the modified image and, at 1104, saves the indication of the area of interest and associates it with the image for future retrieval, if desired. The non-selected area can optionally be discarded.

The invention enables several new business methods. As a first business implementation, the invention can be applied for operating a continuous collaboration help desk. When the image is part of a help desk or other call center application, the invention allows the help desk to offer the service of interactive help with shared images. That is, the calling party and the call center representative may discuss an image, focus or zoom on regions of interest on the image, and interactively alter the image.

Interactive text and image chatting can also be enhanced by the present invention. Text chat via SMS can be augmented by the addition of an interactive image to provide fuller communication and sharing without vocalizing. Images can help to overcome language barriers and other communication difficulties. Further, the interactivity of the whiteboard collaborative functions enriches the communication between the parties.

Yet another application of the invention would be for allowing a service provider to provide selective compression of an image. For example, in a retail environment, a server providing this service may be present at a kiosk and may provide the image service along a Bluetooth™ connection to the camera or digital communication device. Therefore, an attendee at a convention may capture the image of the barcode of a product of vendor, indicate and area of interest (such as the barcode as distinct from the convention center background) on the viewfinder and communicate it (compressed or uncompressed) to a central barcode recognition agent.

The invention has been described with reference to several preferred embodiments. It will be understood by one having skill in the art that other variations and implementations may be undertaken without departing from the spirit and scope of the invention as set forth in the appended claims.

What is claimed is:

1. A method for handling an image of an image subject at a digital image capture camera device comprising the steps of:
    capturing an image comprising image information and at least one randomly located item identifier embodying information about the image subject of the image information;
    automatically analyzing the image to locate the at least one item identifier in a randomly located area of interest of the captured image based on the contents of the area of interest; and
    selectively processing said at least one item identifier.

2. The method of claim 1 wherein said locating further comprises extracting at least one item identifier from said image.

3. The method of claim 1 wherein said at least one item identifier comprises barcode information.

4. The method of claim 3 wherein said selective processing comprises decoding said barcode information.

5. The method of claim 3 wherein said locating further comprises determining the dominant orientation of said barcode information.

6. The method of claim 3 wherein said locating further comprises extracting edges from said image to locate said barcode information.

7. The method of claim 1 further comprising segmenting said item identifier from said image.

8. The method of claim 7 wherein said segmenting comprises segmenting said item identifier from said image.

9. The method of claim 7 further comprising discarding nonsegmented information from said image.

10. The method of claim 2 wherein said selective processing comprises transmitting said item identifier to a remote location.

11. The method of claim 1 wherein said selective processing comprises determining the coordinates of said item identifier.

12. The method of claim 11 wherein said selective processing further comprises transmitting said coordinates to a remote location.

13. The method of claim 2 wherein said selective processing comprises selectively compressing said at least one item identifier.

14. The method of claim 13 further comprising transmitting said selectively compressed at least one item identifier.

15. The method of claim 1 wherein said selective processing comprises creating metadata about said at least one item identifier.

16. The method of claim 15 wherein said selective processing further comprises associating said metadata with said at least one item identifier.

17. The method of claim 16 wherein said selective processing further comprises transmitting at least one of said metadata and said at least one item identifier to a remote location.

18. A system for handling a digital image of an image subject comprising:
    an image capture camera device for capturing a digital image, said digital image comprising image information and at least one randomly located item identifier embodying information about the image subject of the image information; and
    a processing Component comprising:
    an item identifier locating component for automatically analyzing the image to determine the location of said at least one item identifier in a randomly located area of interest of the captured image based on the contents of the area of interest; and at least one item identifier processing component for determining at least one of a plurality of processes for selectively processing said at least one item identifier.

19. The system of claim 18 wherein said at least one item identifier processing component comprises a transmitter for transmitting said at least one item identifier to a remote location.

20. The system of claim 18 wherein said at least one item identifier processing component comprises compression means for compressing said at least one item identifier for transmission.

21. The system of claim 18 wherein said at least one item identifier processing component comprises a metadata creating component for creating metadata for said at least one item identifier.

22. A digital camera for handling a digital image of an image subject comprising:
    an image capture device for capturing a digital image of an image subject, said digital image comprising image information and at least one randomly located item identifier embodying information about the image subject of the image information; and
    a processing component comprising:
    an item identifier locating component for automatically analyzing the image to determine the location of said at least one item identifier in a randomly located area of interest of the captured image based on the contents of the area of interest; and at least one item identifier processing component for selectively processing said at least one item identifier.

* * * * *